Oct. 30, 1951
M. BONNET
2,573,243
CAMERA FOR SNAPSHOT RELIEF PHOTOGRAPHY
Filed March 13, 1948
2 SHEETS—SHEET 1
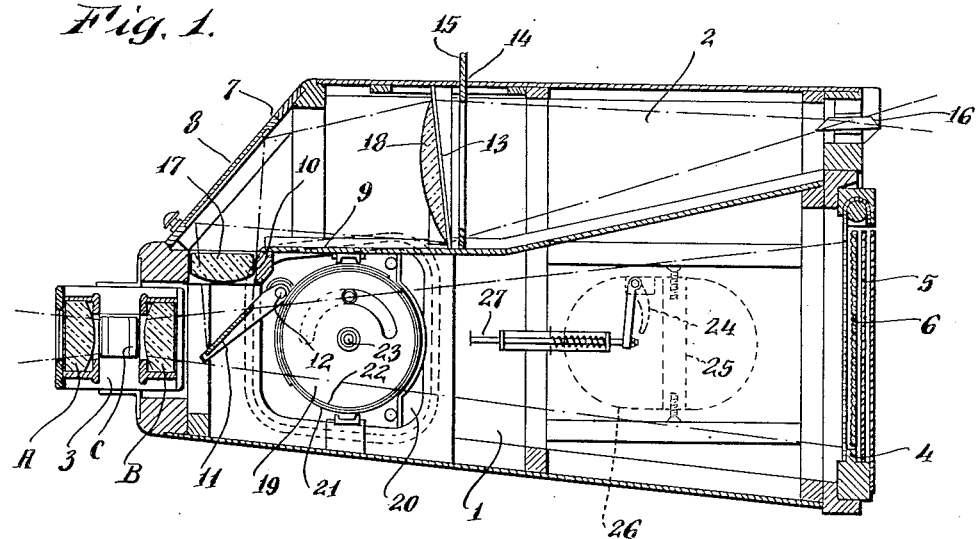
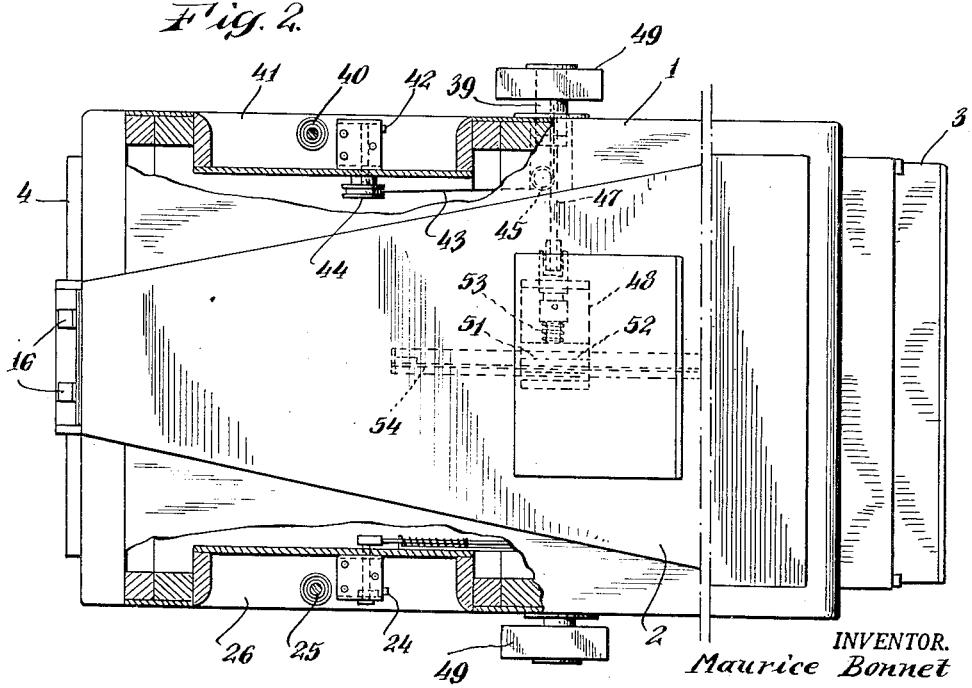
INVENTOR.
Maurice Bonnet
BY
Houltine, Lake & Co.
AGENTS.

Oct. 30, 1951 M. BONNET 2,573,243
CAMERA FOR SNAPSHOT RELIEF PHOTOGRAPHY
Filed March 13, 1948 2 SHEETS—SHEET 2
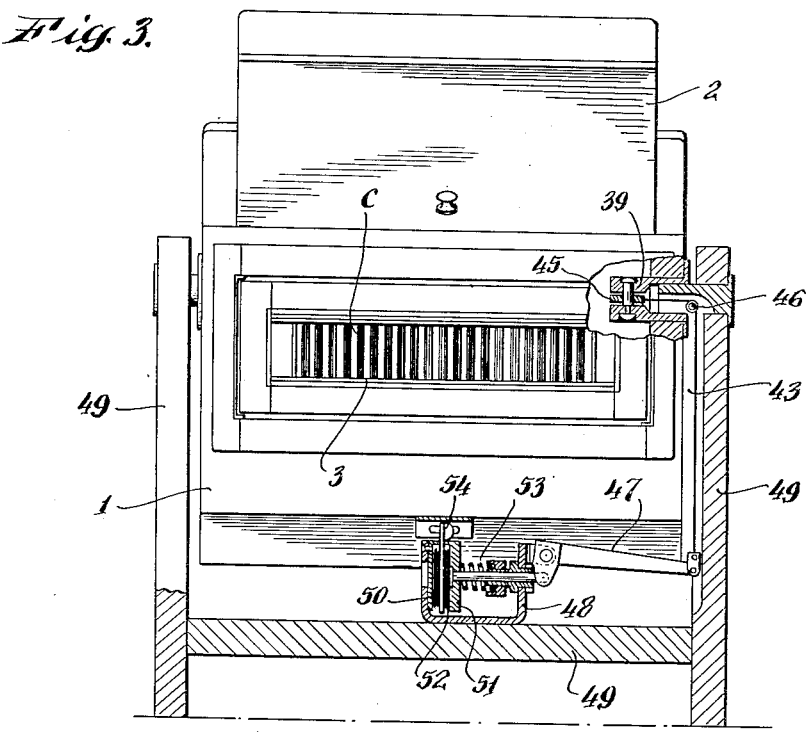
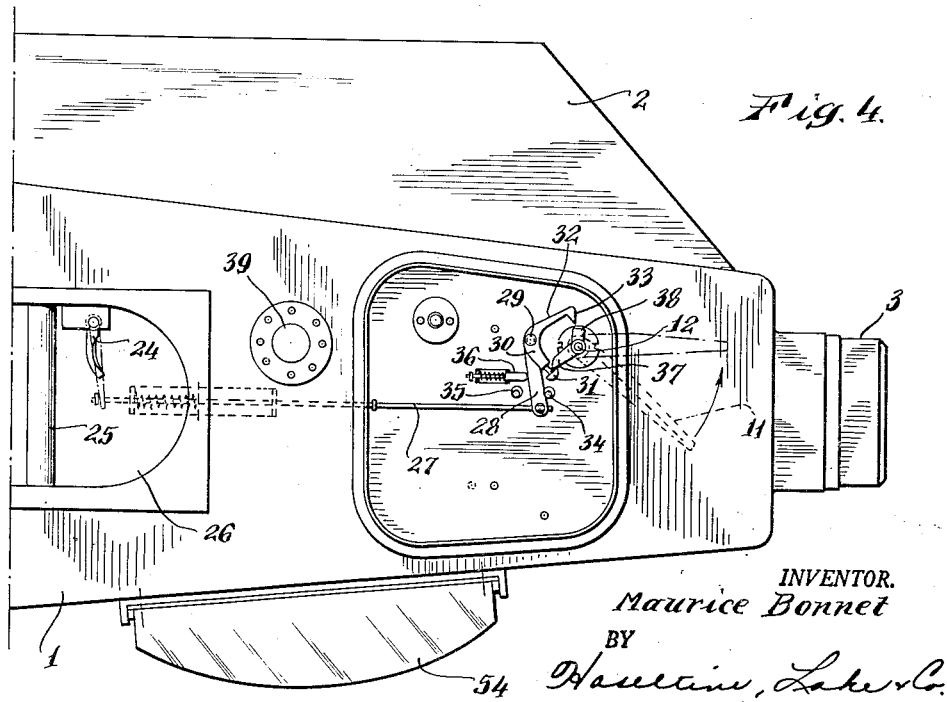
INVENTOR.
Maurice Bonnet
BY
Haseltine, Lake & Co.
AGENTS Patented Oct. 30, 1951

2,573,243

UNITED STATES PATENT OFFICE 2,573,243

CAMERA FOR SNAPSHOT RELIEF PHOTOGRAPHY

Maurice Bonnet, Paris, France, assignor to La Reliephographie, Société pour l'Exploitation des Procédés de Photographie en Relief Maurice Bonnet, Paris, France, a French corporation Application March 13, 1948, Serial No. 14,734
In France March 17, 1947

2 Claims. (Cl. 95—18)

The present invention relates to a camera, adapted, more particularly, for relief or stereoscopic photography, and especially for snapshot photography.

Various devices are known for taking relief photographic views, some of which operate by displacement of the camera with respect to the subject, others by rotation of the subject with respect to the camera which is stationary, and yet others comprise one or more horizontal rows of lenses forming a base line for taking views. Lastly there exist cameras of stationary type which comprise a base of more reduced width formed of a single lens having a large and generally rectangular opening.

This invention relates to this latter kind of cameras. It has essentially for its object to provide means making it possible to obtain an easy and rapid sight, framing and focussing. It also covers simple and efficacious mechanisms for locking the camera in the position of sight and releasing the shutter. The general arrangement of the apparatus according to the invention is well adapted for an economical manufacture and makes it possible to obtain cameras of a very compact form which are easy to manipulate.

Moreover, these advantages are not restricted to cameras for relief photography. By substituting an ordinary lens for the special lens of this camera, one obtains a camera for conventional photography which offers all the advantages due to the improvements which form the subject-matter of the invention.

According to an essential feature the stationary camera for relief photography chosen by way of example, is formed of two pyramidal rigid chambers which are inverted and superposed with substantially parallel horizontal axes, the lower chamber being provided at the top with a special rectangular lens with inverting elements for taking views and with a retractable sighting mirror, and at its lower part with a removable plate-holder containing the sensitive surface and an optical selecting screen (selectograph) combined therewith. The upper chamber is provided at its lower part with a sloping mirror forming an optical combination with the retractable mirror and at the top with two reversing eye-glasses.

Other features of the invention will be apparent from the following description and from the appended drawings in which:

Figure 1 is a longitudinal sectional view of the camera which forms the subject-matter of the invention and more particularly the lens and the shutter.

Figure 2 is a plan view of said camera.
Figure 3 is a front view of the same.
Figure 4 is a side view showing, more particularly, the control mechanism for the shutter.

As shown in Figure 1, the apparatus comprises two chambers 1 and 2 of a generally pyramidal shape which are arranged top to bottom and superposed vertically, the horizontal axes of both said chambers being substantially parallel.

The lower chamber 1 forms the photographic camera proper and the upper chamber 2 forms the sighting chamber. Mounted at the top of the photographic chamber 1 is a special interchangeable object-glass 3 comprising a horizontal row of reversing members C between two rectangular lenses A and B. This lens is more particularly described in patent application Ser. No. 1,117 filed in Great Britain by the applicant on August 29, 1947 for "Improvements in or relating to stationary relief photographic cameras" (Cas XLV).

At the rear end or bottom of chamber 1 a dark slide shutter 4 can be mounted which contains, on the one hand, the negative photo-sensitive surface 5 and, on the other hand, a selecting network with lenticular elements 6 or selectograph of the known type.

The sighting chamber 2 comprises on its front side or bottom a wall hinged at 7 in order to form a cover and to which a mirror 8 is secured.

The wall 9 common to both chambers comprises at 10 a window through which the rays of light can pass which are reflected at the exit of lens 3 through a mirror 11. Said mirror is retractable by rotation about spindle 12 under the action of a mechanism which will be described later and which is shown more specifically in Figure 4. In its retracted position mirror 11 is orientated horizontally.

After reflection through mirror 8 the image of the subject is formed on a ground glass plate 13. A slot 14 provided in the upper or side wall of the sighting chamber 2 makes it possible to place against the ground glass plate 13 interchangeable masks 15 corresponding to the various sizes which can be used in the camera.

Mounted at the rear end or top of the sighting chamber 2 are two reversing prisms 16 (Wollaston prisms) through which the operator can see in its correct position the image of the subject which forms inverted on the ground glass plate 13.

Preferably, a converging lens is mounted in the window 10. Said lens acts in such a manner that it forms the reflected image nearer to the mirror 8 and makes it thus possible to locate the ground glass plate 13 in a part of chamber 3 where more space is available for the mounting of said glass plate and of the masks 15. The size of said image can, therefore, be increased correspondingly. In any event, the general construction is such that the image is focussed on the photo-sensitive surface 5 when it appears perfectly sharp on the glass plate 13. A field lens 18 is preferably combined with this ground glass plate.

The shutter with which the apparatus is equipped is of a very particular type owing to the conditions in which it has to operate with precision on the whole width of lens 3 which can reach for example 200 to 400 millimetres.

According to the invention the shutter 19 and its control mechanism form an interchangeable block which can be introduced endwise into an opening 20 formed in the camera 1. It is essentially provided of two rigid members 21, 22 of a cylindrical shape the width of which is equal to that of the object-glass 3 and which are supported through the medium of end cheeks on the stationary spindle 23 of said shutter.

The shutter and retractable sighting mirror 11 are actuated according to the invention by a common mechanism which insures the correct sequence of operations, since the retraction of the mirror 11 must occur before the operation of shutter 19. Said mechanism is actuated by the operator by means of a trigger 24 combined with a handle 25 secured to the rear part of camera 1 in a recess 26 provided in the side wall of said camera.

As shown in Figure 4 said mechanism comprises a traction rod 27 actuated at one end through trigger 24 and pivotally secured at its other end to arm 28 of a three-armed lever axially mounted on a stationary fulcrum 29. Said lever comprises a second arm 30 at the end of which is provided an adjustable head 31 and a third arm 32 terminating in a nose 33. The pivoting movement of the treble lever is limited through both stops 34, 35. Arm 28 can come to act upon the usual push piece 36 which controls the releasing of the shutter through the medium of a mechanism of a known type. Behind the adjustable head 31 is a groove engageable with the nose of a lever 37 keyed on the spindle 12 of the retractable sighting mirror 11. Said spindle 12 also carries a sector-shaped cam 38 also keyed thereto and on the periphery of which nose 33 of arm 32 can come to bear. Axis 12 can be rotated by hand through an external button, not shown, in order to bring the retractable mirror 11 to its sighting position indicated in Figure 1 and in which it is maintained through head 31.

The operation of the device is as follows: In Figure 4 the parts are shown in the sighting position wherein lever 37 engages with its nose under head 31 of arm 30 against the action of a spring, not shown, which tends to displace this arm and the mirror 11 in the direction indicated by the arrow. Arm 28 of the lever bears then against the stationary stop 34.

If a traction is exerted on rod 27 through the medium of trigger 24 the three armed lever unit 28, 30, 32 rotates around the stationary spindle 29. Before the arm 28 engages the second stationary stop 35 arm 30 first releases lever 37 so that mirror 11 under the action of its return spring comes to assume the position of retraction shown in chain dotted lines. Then arm 28 comes into contact with the shutter releasing member 36. According to the invention this releasing action is possible only when mirror 11 has reached its position of retraction (horizontal position). Indeed, so long as this mirror has not yet achieved its stroke, cam 38 is opposite nose 33 of lever 32 and locks the latter so that the three-armed lever is momentarily arrested in its rotation. It can complete its movement only when cam 38 has moved out of the path of nose 33.

When the operator releases trigger 24 the lever returns to the position shown in the drawing and comes to rest against the stationary stop 34. The retractable mirror 11 can then be brought again, by hand, to the sighting position shown in dotted lines in Figure 4 and the nose of lever 37 engages again below head 31.

Since the apparatus made in accordance with the invention is entirely rigid the focussing is effected by shifting it as a whole with respect to the subject to be photographed. To this end it is mounted on a rolling stand 49 of any construction with respect to which it can turn around the horizontal axis 39.

It is possible for the operator to grasp the camera firmly and to direct it conveniently toward the subject to be photographed because trigger 24 is combined with the side handle 25. A second handle 40 is provided on the opposite side wall in a recess 41 symmetrical to recess 26.

In order to insure the stability of chambers 1, 2 at the moment chosen for releasing the shutter a further locking mechanism is provided as shown in Figures 2 and 3. According to the invention said mechanism is normally clamped. The operator releases it by acting upon a small handle 42 (see Figure 2) combined with handle 40. Connected with this small handle is a flexible cable 43 which passes around the pulleys 44, 45 and 46, the two latter pulleys pertaining to trunnion 39 so that the inclination of the chamber is effected through the operation of the locking mechanism.

The other end of cable 43 is secured to a bellcrank lever 47 mounted for rotation in a mounting 48 fixed to stand 49 and provided with a lining 50. Lever 47 controls a plate 51 which is also provided with a lining 52 and normally applied through a strong spring 53 against a blade 54 fast with chamber 1.

As shown in Figure 4 said blade 54 forms a sector the centre of which coincides with axis 39.

By acting on handle 42 with the left hand the operator releases the clutch 50, 52, 54 and makes it possible for chamber 1 to turn freely around axis 39.

Without releasing both handles 25 and 40 and when the framing and the focussing are completed the operator releases the small handle 42 in order to lock the chamber and he acts with his right hand upon trigger 24 in order to release the shutter.

This combination of means insures an easy and very rapid manipulation and makes it possible to obtain the best conditions for taking views.

Of course, it is possible to bring numerous constructive modifications to the devices which are described and shown without departing from the scope and spirit of the invention. Thus, for example, the Wollaston prisms can be substituted by other optical reversing systems and possibly by magnifying systems so as to enlarge for the observer the image formed on the ground glass plate 13 with a view to facilitating the focussing.

Also various members of the locking and releasing mechanisms can be modified according to the needs.

As mentioned above, the numerous advantages offered by the invention can be applied not only to cameras for relief photography but also to ordinary cameras which differ from the first named cameras only as to the lenses.

I claim:

1. In a photographic apparatus, a camera with conventional lens, shutter and viewing device, a stand rolling on the ground, co-axial horizontal trunnions for the camera, said trunnions being perpendicular to the optical axis of the camera, and a mechanism for locking the camera in adjusted angular position on the trunnions of the stand, said mechanism comprising a sector-shaped blade fixed to the camera, a spring clamp on the stand, having a fixed jaw and a movable jaw, and an actuating member on the camera, including a flexible cable connected to the movable jaw, the blade being positioned for adjustment between the jaws of the clamp.

2. In a photographic apparatus, a camera with conventional lens, shutter and viewing device, a stand rolling on the ground, co-axial horizontal trunnions for the camera, said trunnions being perpendicular to the optical axis of the camera, a mechanism for locking the camera in adjusted angular position on the trunnions of the stand, said mechanism comprising a sector-shaped blade fixed to the camera, a spring clamp on the stand, having a fixed jaw and a movable jaw, an actuating member on the camera, including a flexible cable connected to the movable jaw, the blade being positioned for adjustment between the jaws of the clamp, a gripping handle on each side of the camera, for moving both stand and camera, a shutter release trigger, located adjacent one of the handles for finger-actuation by the hand gripping that handle, an adjustment release trigger for said locking mechanism, located adjacent the other handle, for finger-actuation by the other hand, and respective connecting means between the triggers and the shutter control and movable jaw.

MAURICE BONNET.

REFERENCES CITED

The following references are of record in the file of this patent:

UNITED STATES PATENTS

| Number | Name | Date |
|---|---|---|
| 1,275,249 | Hlavaty | Aug. 13, 1918 |
| 1,334,532 | Griffith | Mar. 23, 1920 |
| 1,484,584 | Tauern | Feb. 19, 1924 |
| 2,182,097 | Schenk | Dec. 5, 1939 |
| 2,252,640 | Nuchterlein | Aug. 12, 1941 |
| 2,343,015 | Lewis | Feb. 29, 1944 |

OTHER REFERENCES

Ser. No. 304,702, Kuppenbender (A. P. C.), published May 4, 1943, abandoned.